May 17, 1955
R. W. MASEK
2,708,589
TENSION ACTUATED PIPE COUPLING
Filed May 11, 1949
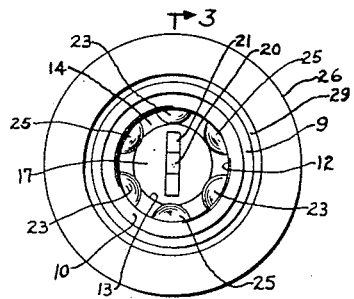
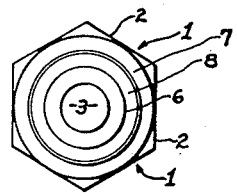
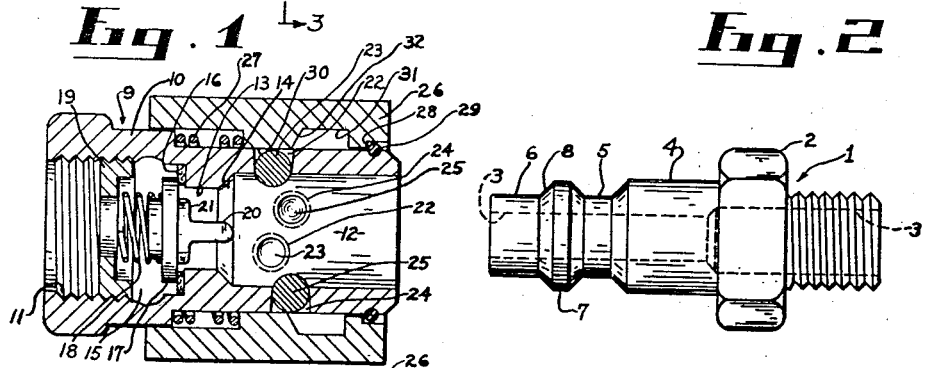
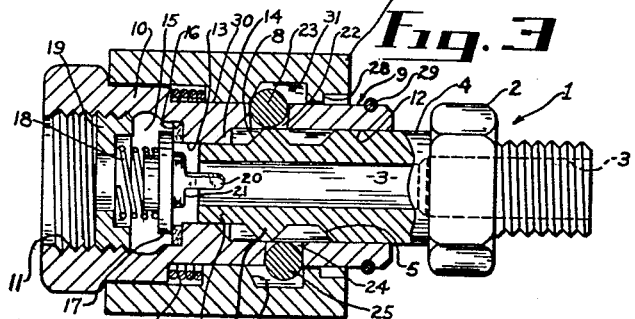
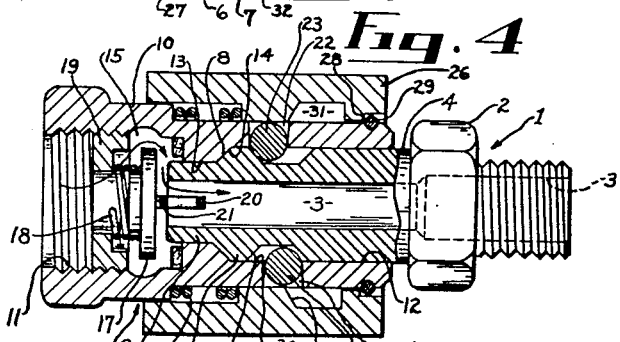
INVENTOR.
Robert W. Masek,
BY Gehr & Leonard,
his attorneys.

2,708,589

TENSION ACTUATED PIPE COUPLING

Robert W. Masek, Cleveland, Ohio

Application May 11, 1949, Serial No. 92,571

15 Claims. (Cl. 285—169)

This invention relates to quickly attachable and detachable couplings of the general character disclosed in U. S. Letters Patent Nos. 2,377,812 and 2,461,699, issued on June 5, 1945, and February 15, 1949, respectively.

A typical coupling of the general type disclosed in these patents comprises a male member and a female member which are adapted for connection to different portions of a hose, pipe line, and the like, or other elements to be coupled thereby. The male member is insertable axially into the female member and has near its forward end an external annular locking shoulder which is engaged by suitable balls or locking pins which are moved radially inwardly in the female member and retained in inward position by an external sleeve on the female member after the male member is fully inserted so that the balls or pins, due to their engagement with the annular shoulder of the male member, secure it in coupling relation in the female member.

In the earlier of the above mentioned patents, there is shown a coupling of this general character in which, when the male and female member are in uncoupled condition, the balls are normally released so that the device can be manipulated with only one hand for connecting the male and female members, this being accomplished merely by inserting the male member. The structure, however, requires a number of parts in addition to those commonly employed in such couplings and which render it rather expensive.

In the latter of the above mentioned patents there is illustrated a similar coupling in which the locking sleeve for the radially movable locking balls is moved by one hand into a ball releasing position and latched in said position by a set of auxiliary balls, the latter of which are released by insertion of the male member and which, when released, permit the sleeve to be moved by a return spring from a retracted position to one in which it locks the locking balls in locking engagement with the male member; thus in the latter instance, the operator can use one hand to retract the sleeve and lock it in locking position and then with one hand can insert the male member into the female member whereupon the male member is automatically locked in coupling relation in the female member.

In the present invention the locking sleeve of the female member is normally held in locking position by a spring but is arranged to be moved out of locking position by initial movement of the male member into the female member toward fully inserted position and upon full insertion of the male member is automatically returned by its return spring to locking position. Thus the present invention facilitates the coupling and uncoupling of the device, makes possible its manipulation with one hand, and operates to perform its function with a minimum of simple and inexpensive operating parts.

The present coupling comprises one of the type in which the female member carries a plurality of radially movable locking balls which are normally held in locking position by a spring operated sleeve on the female member, and a male member which is insertable axially to coupling position within the female member and has an annular external shoulder engaged by the locking balls for holding the members in coupled position and is characterized in that a set of radially movable camming balls are provided in the female member and are arranged to be engaged and operated by the male member during initial movement of the male member into the female member toward coupling position to retract the sleeve so as to release the locking balls and thereby permit full insertion of the male member and to release the sleeve upon full insertion of the male member whereupon the sleeve is returned by its spring to its locking position with respect to the locking balls and retains them in position to hold the members in coupled relation.

The objects and advantages of the present invention will become apparent from the following description wherein reference is made to the drawings, in which:

Fig. 1 is an end elevation of the female member of the coupling as viewed from the receiving end;

Fig. 2 is an end elevation of the male member as viewed from the inserted end;

Fig. 3 is a longitudinal sectional view of the female member taken on the line 3—3 in Fig. 1 and a side elevation of the male member showing the members in disconnected condition in position for initial insertion;

Fig. 4 is a longitudinal sectional view of the female member and a side elevation, partly in section, of the male member showing the relative position of the members during the initial stages of insertion; and Fig. 5 is a view similar to Fig. 4 showing the relative positions of the members when locked in fully inserted position.

Referring to Figs. 1 through 3, the male member 1 is generally tubular in form and is provided with an integral nut portion 2 and threaded portion, as illustrated, the latter being adapted for cooperation with a pipe, hose fitting, or element to be coupled by the coupling. The male member 1 has an axial bore 3 extending entirely therethrough and open at the ends for affording passage for fluid through the male member. At its forward portion the male member 1 has a constant diameter portion 4 and therebeyond toward the forward end has an annular groove 5 and a reduced diameter portion 6 between which is a head portion 7 which preferably is of the same diameter as the constant diameter portion 4. The head portion 7 has a forwardly facing annular cam shoulder 8 which slopes outwardly from its forward to its rearward limit at an angle of about 45° to the axis of the male member.

The female member, indicated generally at 9, comprises a tubular body 10 which is internally threaded at one end, as indicated at 11, for connection to a threaded pipe or other element to be coupled. The female member 9 has an axial entry bore 12, the diameter of which is substantially equal to the maximum diameter of the head 7 and the constant diameter portion 4 of the male member. At the inner end of the bore 12 is a connecting reduced diameter bore 13, the juncture between the bores 12 and 13 being bevelled to provide a seat 14 against which the cam shoulder 8 of the head is seated when the male member is fully inserted. The body 10 also has an axial bore or cavity 15 of greater diameter than the bore 13 for accommodating a valve. The annular shoulder between the bores 13 and 15 is provided with a suitable seating washer or gasket 16 which may be of rubber or synthetic resilient material.

Mounted in the bore or cavity 15 is a valve plug 17 which is adapted to seat on the washer 16. The plug 17 is urged and resiliently held in seating position on the seating washer 16 by a spring 18 which at one end engages the valve and at the opposite end seats on a suitable collar 19.

On the side facing the seating washer 16 the valve plug 17 has a flat relatively thin flat fin or projection 20 which is of greater width, radially of the valve, than the diameter of the bore 3 and which is provided with a reduced end receivable in the bore 3 when the male member is inserted in the female member. Shoulders 21 are provided at the base of the reduced end portion and are engageable by the annular forward end of the male member 1 when the male member is inserted, this engagement occurring before the male member has reached the fully inserted position so that when it is moved to seated position it moves the valve 17 to open position against the compression of the spring 18, thus forming a passage for fluid through both of the members when the male member is fully inserted to seated position.

The female member has a plurality of generally radial passages 22 which extend from the outer surface entirely through the body 10 and open into the bore 12. Each passage 22 is slightly tapered from its outer end to its inner end. In the form illustrated the axes of the passages 22 have a common diametral plane which extends through and normal to the axis of the bore 12 but the axis may be sloped relative to the plane described if desired. In each passage 22 is a ball 23 which is movable radially in the passage but is of such size that it can protrude into the bore 12 but cannot pass inwardly entirely through the passage and drop out of the inner ends thereof.

The female member 10 also has a plurality of radial passages 24 which extend from the outer surface entirely into the bore 12 and which are tapered in a manner similar to the passages 22. The passages 24 likewise preferably are arranged with their axes in a common plane normal to the axis of the bore 12. The common diametral plane of the passages 24 is offset endwise of the bore 12 from the common diametral plane of the passages 22 toward the end of the bore 12 through which the male member 1 enters for forming the connection. In each passage 24 is a ball 25 which is of a proper size so that, when fully inserted in its passage 24, it protrudes into the bore 12.

Carried by and surrounding the female member 9 in coaxial relation therewith is a locking sleeve 26 which is slidable axially of the female member and is normally urged to the right or entry end of the female member 9 by a spring 27. The sleeve 26 has an internal annular shoulder 28 which is positioned to engage a snap retaining washer 29 for preventing the sleeve from being forced off the entry end of the female member by the spring 27 and which arrests movement of the sleeve 26 toward the entry end of the female member in the position in which it holds the balls 23 in fully inserted position.

The sleeve has an annular retaining surface 30 and an internal annular groove 31 between which is a sloping annular cam shoulder 32, the cam shoulder 32 sloping outwardly and toward the entry end of the female member at an angle of about 75° to the axis of the bore 12.

In Fig. 3 the parts of the female member are shown in the position they normally occupy when the male member is entirely withdrawn. In this condition the valve 17 is seated, the sleeve 26 is moved to its extreme position against the snap washer 29 and both rows of balls 23 and 25 are held by the annular retaining surface 30 in fully inserted position in their respective passages so that they protrude into the bore 12. The surface 30 is positioned relative to the balls 25 so that the diametral plane of the balls 25, radially of the female member, is just beyond the juncture of the surfaces 30 and 32 in a direction toward the outer end of the bore 12.

The respective rows of balls are so spaced from each other axially of the bore 12 that upon initial insertion of the male member the sloping shoulder or cam surface 8 of the male member engages the balls 25. Due to the camming action exerted by continued movement of the male member toward the fully inserted position the balls 25 are moved outwardly. The innermost edge of the cam surface 32 of the sleeve 26 is positioned just beyond the maximum diameter of the balls 25 in a direction away from the entry end of the bore 12. Consequently continued movement of the male member toward fully inserted position forces the balls 25 outwardly and along the camming surface 32 of the sleeve and this action cams the sleeve 26 toward the threaded end 11 of the female member. This action continues until the balls 25 approach the radially outermost edge of the cam surface 32 in which position they are resting on the maximum diameter of the head 7. At this time the sloping cam surface 8 has moved forwardly a sufficient distance to engage the balls 23 and the sleeve has been moved so that the radially inner edge of the cam surface 32 is positioned to be engaged by the balls 23 just beyond their maximum diameter in a direction away from the outer end of the bore 12. Continued movement of the male member toward fully inserted position causes the surface 8 to cam the balls 23 along the surface 32 thus forcing the sleeve 26 further toward the threaded end of the female member and disposing the groove 5 of the male member adjacent the balls 25. This action continues until the maximum diameter portion of the head 7 has passed beyond the common diametral plane of the balls 23; the balls 23 upon being moved radially outwardly by the surface 8 being accommodated in the groove 31 of the sleeve.

As the head portion 7 passes the balls 23, the sleeve 26 is urged by the spring 27 toward the washer 29 and causes the cam surface 32 to cam the balls 23 radially inwardly until they are fully inserted and retained in fully inserted position by the annular retaining surface 30 of the sleeve in which position they extend into the groove 5. The balls 25 likewise upon further movement of the sleeve toward the washer 29 are cammed radially inwardly by the surface 32 and extend into the groove 5 of the male member.

Thus the balls 23 are firmly engaged in the groove 5 in back of the head 7 of the male member and are prevented from radial displacement by the surface 30 of the sleeve 26 and thus lock the members securely together in coupling relation. The reduced diameter portion 6 of the male member, when the male member is thus locked in position, is accommodated with slight radial clearance in the reduced diameter bore 13 and holds the valve 17 unseated due to the engagement of the annular end of the male member with the shoulders 21 on the fin 20 and the cam surface 8 is firmly seated against the seating shoulder or surface 14 of the female member. Thus the members are retained firmly in coupled condition and afford a passage for fluid therethrough.

Accordingly, therefore, in order to couple the members it is only necessary to force the male member into the female member without grasping and retracting the sleeve 26, the act of insertion of the male member itself causing the retraction of the sleeve as the male member is inserted. When the male member is fully inserted, the spring 27 automatically returns the sleeve to its locking position.

To disconnect the members it is only necessary to grasp the sleeve 26 and pull it toward the threaded end 11 of the female member 9 whereupon the balls 23 and 25 are released and the female member can be freely withdrawn.

It is apparent therefore that by providing the double row of balls of which the common diametral plane of the balls of one row are offset at a proper distance from the common diametral plane of the balls of the other row in a direction axially of the bore 12, and correlating the position of the retaining surface 30, the cam surface 32, the groove 31 of the sleeve, the length of the maximum diameter of the portion of the head 7 and groove 5, a very effective coupling with a minimum number of simple and inexpensive parts, is provided and is adaptable to many sizes and lengths of couplings, the important feature being that the initial insertion of the male member effects partial retraction of the locking sleeve through the camming balls, and continued movement of the male member toward the fully inserted position causes this movement to be continued by the locking balls, whereby the sleeve is moved to fully retracted position and is so retained until the male member is fully inserted, whereupon the sleeve is automatically returned to starting or locking position.

Having thus described my invention, I claim:

1. A detachable coupling comprising a female member having a bore, a male member receivable endwise in the bore and having a locking shoulder, a locking element carried by the female member and movable relative thereto into said bore to locking position and outwardly of said bore to releasing position, said shoulder being engageable by, and locked by the locking element when the male member is fully inserted and the locking element is moved into locking position, a locking sleeve movably mounted on the female member and having a retaining portion for retaining the locking element in locking position when the sleeve is in normal position, a spring yieldably holding the sleeve in said normal position, a first cam means mounted in the female member for movement into and out of the bore and engageable by the male member and movable thereby outwardly of the bore upon movement of the male member into said bore part way toward fully inserted position, complementary cam means on the sleeve engageable by said first cam means, when the sleeve is held in said normal position by the spring, and operated thereby when the first cam means is moved outwardly following said engagement to move the sleeve from said normal position against the force of the spring sufficiently to release the retaining portion from the locking element, thereby permitting movement of the locking element out of locking position, and said locking element being engageable and movable outwardly of the bore by the male member during farther insertion of the male member when the retaining portion is so released, said male member having cavity means adapted to receive and accommodate the locking element in locking position and the first cam means in its inward position, respectively, when the male member is fully inserted and the shoulder thereby is in position for locking, thereby releasing the first cam means and locking element for inward movement so that the sleeve can be returned by said spring to said normal position while the member is in fully inserted position and lock said locking element in its locking position.

2. A detachable coupling comprising a female member having a bore, a male member receivable endwise in the bore and having a locking shoulder, a locking element carried by the female member and movable relative thereto into said bore to locking position and outwardly of said bore to releasing position, said shoulder being engageable by and locked by, the locking element when the male member is fully inserted and the locking element is in locking position in the bore, a locking sleeve movably mounted on the female member and having a retaining portion for locking the locking element in lockign position when the sleeve is in normal position, a spring yieldably holding the sleeve in said normal position, a first cam means mounted in the female member for movement into and out of the bore and engageable by the male member and movable thereby outwardly of the bore upon movement of the male member into said bore part way toward fully inserted position, complementary cam means on the sleeve engageable by the first cam means, when the sleeve is held in said normal position by the spring, and operated by said first cam means when the first cam means is so moved outwardly following said engagement to move the sleeve from said normal position against the force of the spring sufficiently to release the retaining portion from the locking element thereby permitting movement of the locking element outwardly away from locking position, and to dispose said complementary cam means in position to be engaged by the locking element as the locking element is moved outwardly of the bore, said locking element being engageable by, and movable outwardly of the bore by, the male member during farther insertion of the male member, and operative, when moved outwardly by the male member, to continue the movement of the sleeve against the force of the spring away from said normal position, said male member having cavity means adapted to receive and accommodate the first cam means in its inward position and the locking element in its locking position, respectively, when the male member is fully inserted and the shoulder thereby is in locking position, thereby releasing the first cam means and locking element for inward movement, so that the sleeve can be returned by said spring to said normal position and lock the locking element in locking position.

3. A coupling comprising a female member having a bore with an open receiving end, a male member having a leading end portion receivable axially in said bore from the receiving end, a sleeve member movably mounted on the female member, a locking element carried by the female member and movable relative thereto partially into said bore to a locking position with respect to the male member, and engageable by said male member and movable thereby out of said bore to an inoperative position upon movement of said male member into said bore part way toward fully inserted position, said sleeve having a retaining portion engageable with the locking element for retaining the locking element in locking position, when said sleeve member is in normal position, a spring yieldably holding the sleeve member in said normal position, a cam element carried by the female member and movable relative thereto partially into said bore and out of said bore, and engageable by said leading end portion of the male member and movable thereby outwardly of the bore when the male member is moved part way toward inserted position, cam means operatively connecting said sleeve member and cam element for movement of the sleeve member against the force of the spring from normal position to a new position by the cam element upon movement of the cam element outwardly of said bore, in which new position the retaining portion is released from the locking element and the cam means is then engageable by the locking element for continuing the said movement of the sleeve upon outward movement of the locking element, thereby releasing the locking element and permitting the male member to pass the locking element upon continued movement of the male member toward fully inserted position, means on one of the members to operatively release said cam element and locking element for return movement into said bore when the male member is fully inserted, said cam means on the sleeve member being operative to engage and return the locking element into locking engagement with the male member during return of the sleeve member to said normal position, by said spring while the male member is fully inserted.

4. A coupling comprising a female member having a bore with an open receiving end and a laterally extending passage leading therefrom, a locking element in and movable endwise of the passage and protruding into the bore when the element is in an inward position in its passage, a male member having a leading end portion receivable axially in said bore from the receiving end and engageable with the locking element and operative to move the locking element outwardly from the bore during movement of the male member toward the fully inserted position, said leading end portion having a locking shoulder engageable by the element for coupling the members when the element is moved to said inward position in its passage while the male member is fully inserted, a sleeve movably mounted on the female member and operative in one position to permit movement of the element to unlocking position and in another and normal position to retain the element in locking position, a spring yieldably holding the sleeve in said normal position, said female member having a second laterally extending passage leading from said bore, a cam element movable endwise of the second passage and protruding into the bore when the cam element is in an inward position in said second passage, said cam element being engageable by said male member and movable thereby outwardly in its passage when the male member is moved part way toward the position for moving the locking element outwardly, said sleeve having a cam surface engageable by the cam element when the sleeve is in said normal position and operated thereby when the cam element is moved outwardly to move the sleeve against the force of the spring away from the entry end of the bore out of said normal position and into a position in which the locking element is released for outward movement and the said cam surface can be engaged by the locking element and operated thereby to continue said movement of the sleeve and permit the male member to pass the locking element, all upon continued movement of the male member toward fully inserted position wherein the locking shoulder is in position to be engaged and locked by the locking element, said male member having a cavity adapted to receive and thereby permit return of, the locking element and cam element into said bore when the male member is fully inserted, and said cam surface being operative when the male member is fully inserted and the sleeve is being returned by its spring to said normal position to engage and return said locking element and cam element successively to their inward positions, respectively, in their respective passages.

5. A coupling comprising a female member having a bore with an open receiving end and a laterally extending passage leading therefrom, a locking element in and movable endwise of the passage and protruding into the bore when the element is in an inward position, a male member having a leading end portion receivable axially in said bore from the receiving end, said leading end portion having a locking shoulder engageable by the locking element for coupling the members when the element is moved to said inward position in its passage while the male member is fully inserted, a sleeve movably mounted on the female member and operative, in one position to release and permit movement of the element to unlocking position and in another and normal position to retain the element in locking position, a spring yieldably holding the sleeve in said normal position, said female member having a second laterally extending passage leading from said bore, a cam element movable endwise thereof and protruding into the bore when the cam element is in an inward position in its passage, said portion of the male member having a cam shoulder engageable with the cam element and operative to move the cam element outwardly in its passage when the male member is moved part way toward inserted position, said sleeve having a cam surface engageable by the cam element and operated thereby when the cam element is moved outwardly to move the sleeve against the force of the spring away from the entry end of the bore out of normal position into a new position in which the locking element is released and the said cam surface can be engaged by the locking element and operated thereby to continue said movement of the sleeve, said cam shoulder on the male member being engageable with the locking element and operative to move the locking element outwardly upon movement of the male member farther toward fully inserted position, said cam surface on the sleeve being engageable by the locking element when the sleeve is in said new position and operated thereby upon outward movement thereof, to move the sleeve farther from said normal position and to permit the male member to pass the locking element and move into fully inserted position in which the locking shoulder is engageable by the locking element, and said male member having a cavity operable, when the male member is fully inserted, to receive the inner ends of the locking element and cam element, respectively, and thereby permit return of the locking element and cam element into their inward positions, respectively, and said cam means on the sleeve being operative when the sleeve is being returned by its spring to said normal position to engage and return said elements into their inwardly protruding positions.

6. A coupling comprising a female member having a bore with an open receiving end and a laterally extending passage leading therefrom, a locking element in and movable endwise of the passage and protruding into the bore when the element is in an inward position in its passage, a male member having a leading end portion receivable axially in said bore from the receiving end, said portion having a shoulder engageable by the locking element for coupling the members when the element is in said inward position in its passage and the male member is fully inserted, a sleeve movably mounted on the female member and having a cavity adapted, in one position of the sleeve, to be aligned with the outer end of the passage and to receive the element and thereby permit it to move out of its inward position, and having a retaining surface adapted, in another position of the sleeve, to be aligned with the outer end of the passage and operative when so aligned to retain the locking element in its inward locking position, a spring urging the sleeve to said other position, said female member having a second laterally extending passage leading from said bore between the first passage and the receiving end of the bore, a cam element movable endwise in the second passage and protruding into the bore when the cam element is in an inward position in its passage, said portion of the male member having cam shoulder means engageable successively with the cam element and locking element and operative to move the elements successively outwardly in their passages, respectively, during movement of the male member part way toward inserted position, said sleeve having cam surface means engageable initially by the cam element while the sleeve is in said other position wherein the retaining surface is aligned with the first passage and operative by the cam element, as the cam element is moved outwardly in the second passage, to move the sleeve against the force of the spring toward said one position a distance sufficient to displace the retaining surface of the sleeve from the first passage and to dispose the cam surface means of the sleeve in position to be engaged by the locking element for continuing the movement of the sleeve from normal position, thereby releasing the locking element and permitting the locking shoulder of the male member to pass the locking element upon continued movement of the male member toward fully inserted position, and said male member having cavity means adapted to accommodate the inwardly protruding portions of the cam element and the locking element when the male member is fully inserted, the cam surface means of the sleeve being operative to engage and move the locking element and cam element, successively, into the last mentioned cavity means, as said spring returns the sleeve to starting position while the male member is fully inserted whereby the sleeve retains the locking element in locking engagement with the shoulder of the male member.

7. A detachable coupling comprising a female member having an axial bore with an entrance end and having two circumferentially extending rows of generally radially extending passages, said passages opening into said bore and leading therefrom to the outer surface of the female member, the radial plane defined by the axes of the passages of one row being offset axially of the bore from the radial plane defined by the axes of the balls of the other row, locking passages in the passages of the row farther from said entrance end, cam balls in the passages of the row nearer said entrance end, all of said balls being movable outwardly and inwardly of their respective passages and protruding into said bore when moved inwardly, a male member receivable axially in said bore and having a cam surface facing toward its leading end and operative to engage and move the cam balls out of the path of the male member during movement of the male member part way toward fully inserted position and then to engage and move the locking balls out of the path of the male member during continued movement of the male member toward fully inserted position, whereby the cam balls are first moved outwardly from the bore and the locking balls are next moved outwardly from the bore, all of said balls, when moved outwardly of the bore, protruding beyond the outer surface of said female member, an external sleeve coaxial with and slidable axially of the female member, a spring yieldably holding said sleeve in a normal position toward said entrance end, an internal cam on said sleeve sloping outwardly toward its entrance end and surrounding the nearer row of passages when the sleeve is in said normal position and operative upon outward movement of said cam balls to be engaged thereby and move said sleeve axially to a position wherein a portion of said internal cam is disposed in surrounding relation to said farther row of passages and to prevent return of the sleeve from the latter position, and then operative upon outward movement of the locking balls to be engaged thereby and move the sleeve in the same direction farther from said normal position, said sleeve having an internal retaining surface extending from the cam in a direction away from said entrance end and overlying the locking balls when the sleeve is in said normal position, said male member having a circumferential groove adapted to partially accommodate the locking balls and the cam balls when the male member is fully inserted, and the forward wall of the groove being engageable by said locking balls, when retained in said groove, to lock the male member in the female member, said internal cam being operative upon return of the sleeve toward said normal position by its spring, while the male member is fully inserted, to move the row of locking balls and row of cam balls, successively, inwardly into said groove, and said locking surface in overlying relation to the locking balls.

8. A detachable coupling according to claim 7 characterized in that all of the cam balls have the same diameter and all of the locking balls have the same diameter and the offset of said radial planes is approximately equal to the sum of the radius of a cam ball and the radius of a locking ball.

9. A detachable coupling according to claim 7 characterized in that the locking balls and the cam balls have the same diameter and the offset of said radial planes is approximately equal to the diameter of one of the balls.

10. The combination with a detachable coupling comprising a female member having a bore, a male member receivable endwise in the bore and having a locking shoulder, a locking element carried by the female member and movable relative thereto into and out of the bore, said shoulder being positioned to be engaged and locked by said element when the male member is fully inserted and the locking element is moved into the bore, a locking sleeve movably mounted on the female member and having a retaining portion for locking the element in locking position when the sleeve is in normal position, and a spring yieldably holding the sleeve in said normal position, of means movably mounted in the female member and complementary cooperative means in the sleeve engageable and operable by the first means, when the sleeve is in said normal position, to move the sleeve to position to release the retaining portion from the locking element upon predetermined movement of the first means, and said first means being engageable by, and given said predetermined movement by, the male member during movement of the male member partially, toward fully inserted position.

11. A detachable coupling part comprising a female member having a bore adapted to receive endwise a complementary male member to be secured therein in fully inserted position, a detent carried by the female member and movable, selectively, to locking and releasing positions with respect to said male member when the male member is in said fully inserted position, said detent, when locked in locking position prior to insertion of the male member, obstructing the bore against full insertion of the male member, a movable detent actuating and locking sleeve carried by the female member and operable, selectively, in one position to lock the detent in locking position and in another position to release the detent for movement out of locking position, a return spring biasing the sleeve to said one position, actuating means carried by the female member and adapted to be engaged by, and moved by, the male member upon endwise movement of the male member in said bore, part way toward said fully inserted position, prior to said obstruction by the detent, complementary actuating means on the sleeve operatively connected to the first actuating means and operated thereby upon said movement of the first actuating means to move the sleeve to, and hold the sleeve against the force of the spring in, said other position, whereby the male member can be fully inserted in said bore, and said sleeve having a portion operative to return the detent to locking position upon return of the sleeve to said one position.

12. A detachable coupling part comprising a female member having a bore adapted to receive a complementary male member endwise, a detent carried thereby and movable relative thereto generally transversely of the bore partially into the bore to a locking position and outwardly of the bore to a releasing position, a detent actuating and locking sleeve mounted on the female member for movement relative thereto from a normal position, in which it locks the detent in locking position to a detent releasing position and for return movement, respectively, said sleeve having a portion which is operative when the sleeve is returned from detent releasing position to move the detent to locking position, a return spring biasing the sleeve to normal position, a cam element carried by the female member and movable relative thereto, generally transversely of the bore, outwardly of and partially into said bore, respectively, and adapted to be engaged and moved outwardly of the bore by movement of the male member in the bore part way toward a fully inserted position, cooperable cam means operatively connecting the cam element and sleeve for moving the sleeve to its detent releasing position against the force of the spring by the cam element upon said outward movement of the cam element.

13. A detachable coupling part according to claim 12 characterized in that said cooperable cam means operatively connects the sleeve and detent, when the sleeve is in said detent releasing position, for movement of the sleeve by the detent against the force of the spring farther from said normal position as the detent is moved outwardly to its releasing position.

14. A coupling part according to claim 13 characterized in that said cooperable cam means is a single internal cam on the sleeve and is initially engageable by the detent substantially at the end of the movement of the sleeve from normal position by the cam element.

15. A detachable coupling comprising a female member having a bore, a male member receivable endwise therein, a detent carried by the female member and movable selectively to locking and releasing positions with respect to the male member when the male member is fully inserted, said detent when locked in locking position, prior to insertion of the male member, obstructing the bore against insertion of the male member to fully inserted position, a movable detent actuating and locking sleeve carried by the female member and operable, selectively, in one position to lock the detent in locking position and in another position to release the detent for movement out of locking position, a return spring biasing the sleeve to said one position, actuating means carried by the female member and engageable and movable by the male member upon endwise movement of the male member in said bore, part way toward the detent, complementary actuating means on the sleeve operatively connected to the first actuating means and operated thereby upon said movement of the first actuating means to move and hold the sleeve, against the force of the spring, out of its detent locking position, means on the male member operative, upon continued movement of the male member toward fully inserted position while the sleeve is held out of its detent locking position, to engage and move the detent out of the path of the male member, said complementary actuating means operatively connecting the detent and sleeve, when the sleeve is held out of its detent locking position by the first actuating means, for continuing the movement of the sleeve away from the detent locking position by the detent upon movement of the detent out of the path of the male member, means on the male member operative, when the male member is fully inserted, to release the detent from the sleeve and permit the detent to be moved into locking position, and said sleeve having a portion engageable with the detent and operative, upon return of the sleeve, to move the detent into locking position, whereby the sleeve can be returned by the spring and lock the detent in its locking position.

References Cited in the file of this patent

UNITED STATES PATENTS

| | | |
|---|---|---|
| 2,255,333 | Scheiwer | Sept. 9, 1941 |
| 2,463,253 | Earle | Mar. 1, 1949 |